United States Patent
Blackburn et al.

(10) Patent No.: US 9,813,485 B2
(45) Date of Patent: Nov. 7, 2017

(54) COMMUNICATION OF VIRTUAL MACHINE DATA

(71) Applicant: 1E Limited, London (GB)

(72) Inventors: Mark Blackburn, London (GB); Mick Saxton, London (GB); Sumir Karayi, London (GB)

(73) Assignee: 1E LIMITED, London (GB)

( * ) Notice: Subject to any disclaimer, the term of this patent is extended or adjusted under 35 U.S.C. 154(b) by 379 days.

(21) Appl. No.: 13/918,036

(22) Filed: Jun. 14, 2013

(65) Prior Publication Data

US 2014/0372553 A1    Dec. 18, 2014

(51) Int. Cl.
H04L 29/08       (2006.01)
G06F 9/455       (2006.01)
G06F 17/30       (2006.01)
G06F 15/16       (2006.01)

(52) U.S. Cl.
CPC .......... H04L 67/10 (2013.01); G06F 9/45558 (2013.01); G06F 17/30233 (2013.01); H04L 67/34 (2013.01); G06F 2009/45579 (2013.01)

(58) Field of Classification Search
CPC .... G06F 3/00; G06F 9/45533; G06F 9/45558; G06F 17/30; G06F 9/4406; G06F 17/30233; H04L 67/10; H04L 67/34
USPC ....... 709/319, 203, 223, 224, 226, 217–219; 718/1; 713/2
See application file for complete search history.

(56) References Cited

U.S. PATENT DOCUMENTS

| | | |
|---|---|---|
| 6,854,009 B1 | 2/2005 | Hughes |
| 6,976,058 B1 | 12/2005 | Brown et al. |
| 7,380,051 B2 | 5/2008 | Birrell et al. |
| 7,398,349 B2 | 7/2008 | Birrell et al. |
| 7,480,761 B2 | 1/2009 | Birrell et al. |
| 8,176,486 B2 | 5/2012 | Amir Husain |

(Continued)

FOREIGN PATENT DOCUMENTS

| | | |
|---|---|---|
| WO | 2009085977 A2 | 7/2009 |
| WO | 2009085977 A3 | 7/2009 |
| WO | 2011022388 A1 | 2/2011 |

OTHER PUBLICATIONS

Kochut, Andrzej et al. "Evolution of Redundancy Driven Provisioning for Hypervisors with Locally Attached Storage," 2011 IEEE 19th International Symposium on Modelling, Analysis & Simulation of Computer and Telecommunication Systems, pp. 441-443.

*Primary Examiner* — Mahran Abu Roumi
*Assistant Examiner* — Zi Ye
(74) *Attorney, Agent, or Firm* — EIP US LLP

(57) ABSTRACT

At least one of a method, a client computing device, and a server computing device for communicating data associated with a virtual machine are described. In one example, a client computing device is communicatively coupled to a network. A first set of data representative of at least a portion of a virtual machine disk image accessible on the network is determined, the first set of data comprising data arranged in a first sequence. From this first set of data, a second set of data is determined for communication to the client computing device over the network, the second set of data comprising at least a portion of the first set of data arranged in a second sequence, the second sequence being different from the first sequence.

13 Claims, 10 Drawing Sheets

(56) References Cited

U.S. PATENT DOCUMENTS

| | | | |
|---|---|---|---|
| 8,185,684 B1 * | 5/2012 | Naftel | G06F 9/45558 711/173 |
| 8,429,675 B1 * | 4/2013 | Radhakrishnan et al. | 719/319 |
| 8,498,997 B2 | 7/2013 | Murase | |
| 8,656,386 B1 * | 2/2014 | Baimetov | G06F 9/45558 709/219 |
| 8,806,489 B2 * | 8/2014 | Freimuth | G06F 8/63 709/223 |
| 8,893,279 B1 * | 11/2014 | Chandrasekhar | G06F 21/54 726/24 |
| 2003/0037178 A1 * | 2/2003 | Vessey et al. | 709/319 |
| 2004/0162893 A1 | 8/2004 | Brown et al. | |
| 2005/0198239 A1 | 9/2005 | Hughes | |
| 2006/0155674 A1 | 7/2006 | Traut et al. | |
| 2007/0234302 A1 | 10/2007 | Suzuki et al. | |
| 2007/0234337 A1 | 10/2007 | Suzuki et al. | |
| 2007/0260868 A1 * | 11/2007 | Azzarello | G06F 9/4406 713/2 |
| 2008/0201414 A1 * | 8/2008 | Amir Husain et al. | 709/203 |
| 2008/0201455 A1 | 8/2008 | Husain | |
| 2008/0201479 A1 | 8/2008 | Husain et al. | |
| 2009/0164994 A1 | 6/2009 | Vasilevsky et al. | |
| 2009/0249335 A1 | 10/2009 | Vasilevsky et al. | |
| 2009/0249336 A1 | 10/2009 | Vasilevsky et al. | |
| 2009/0249337 A1 | 10/2009 | Vasilevsky et al. | |
| 2010/0042796 A1 | 2/2010 | Vasilevsky et al. | |
| 2010/0042942 A1 | 2/2010 | Vasilevsky et al. | |
| 2010/0042992 A1 | 2/2010 | Vasilevsky et al. | |
| 2010/0042993 A1 | 2/2010 | Vasilevsky et al. | |
| 2010/0042994 A1 | 2/2010 | Vasilevsky et al. | |
| 2010/0287280 A1 | 11/2010 | Sivan | |
| 2011/0040812 A1 | 2/2011 | Phillips | |
| 2011/0055299 A1 | 3/2011 | Phillips | |
| 2011/0061045 A1 | 3/2011 | Phillips | |
| 2011/0061046 A1 | 3/2011 | Phillips | |
| 2011/0078681 A1 | 3/2011 | Li et al. | |
| 2011/0088029 A1 | 4/2011 | Murase | |
| 2011/0126269 A1 * | 5/2011 | Youngworth | 726/4 |
| 2011/0197052 A1 | 8/2011 | Green et al. | |
| 2012/0011509 A1 | 1/2012 | Husain | |
| 2012/0137062 A1 | 5/2012 | Arges et al. | |
| 2013/0055256 A1 * | 2/2013 | Banga et al. | 718/1 |
| 2013/0173540 A1 * | 7/2013 | Qian et al. | 707/625 |

* cited by examiner

COMMUNICATION OF VIRTUAL MACHINE DATA

FIELD OF THE INVENTION

The present invention relates to at least one of a method, a client computing device, and a server computing device for communicating data associated with a virtual machine.

BACKGROUND OF THE INVENTION

In the field of computing, a virtual machine is a system that acts in software on a physical computing device to emulate the functions and/or architecture of another physical computing device. Certain virtual machines are arranged such that the execution of an operating system may take place on an emulated or "abstracted" hardware layer. The operating system "sees" the abstracted hardware layer as conventional computing hardware, i.e. a machine; however the abstracted hardware layer is in fact implemented by computer program code that is loaded into working memory of a host computing device and processed by one or more processors of the host computing device, i.e. is actually a "virtual" machine. For example, a virtual machine manager or "hypervisor" may be run as an application in an application space of the host computing device so as to control the implementation of the abstracted hardware layer, e.g. act as a software "host" for a virtual machine. A virtual machine, as implemented by the virtual machine manager, may use one or more virtual machine disks. These virtual machine disks emulate a conventional storage device, such as a magnetic or solid state drive, and are implemented using a file or other storage extent, e.g. a disk, partition or the like. The file or other storage extent is typically referred to as a virtual machine disk image. Inside the virtual machine, the virtual machine disk appears as a conventional mounted hard disk, e.g. as a "C:\" drive in a Microsoft Windows® system. Outside of the virtual machine, for example to a host operating system, the virtual machine disk image may appear as a large file or reserved set of storage. The contents of the virtual machine disk are typically inaccessible in the host operating system without special tools.

Virtualisation, in one form, has been suggested by some to help manage a proliferation of user-owned devices on closed network systems. In an ideal network environment, control of devices coupled to the network is desired. This may be for reasons of security, e.g. to stop malicious programs propagating on the network or to prevent unauthorised access, and/or network stability, e.g. to prevent hardware failure caused by incorrect processes or functions accessing network control devices. One way to do this is to carefully control the hardware and software configurations of all devices coupled to the network. However, as computing has decreased in cost and increased in mobility over time, more users are bringing their own computing devices to these controlled network environments. This has even given rise to its own acronym: BYOD—bring your own device. While some have tried to ban users from coupling their own devices to controlled networks, this often inconveniences users and is difficult to achieve in practice. Moreover, a similar problem occurs as more users have the option or the need to use a home computing device for remote working.

In the above cases, virtualisation offers users the possibility to connect to a virtual machine. The environment of the virtual machine may be controlled even if the environment of the user-owned device cannot be controlled. For example, a user may open a remote desktop virtualisation application that enables them, on a user-owned device, to access a virtual machine hosted on a remote server. One or more server-hosted virtual machines may be generated as required. This may allow usage loads to be managed without modifying underlying server hardware. However, these systems are not perfect. They require a stable and persistent network connection and are limited by the latency of network and processing systems.

SUMMARY OF THE INVENTION

According to a first example described herein, there is provided a method for communicating data representative of a virtual machine disk image to a client computing device over a network comprising determining a first set of data representative of at least a portion of a virtual machine disk image accessible on the network, the first set of data comprising data arranged in a first sequence and determining, from the first set of data, a second set of data for communication to the client computing device over the network, the second set of data comprising at least a portion of the first set of data arranged in a second sequence, the second sequence being different from the first sequence. The first example may be provided as a computer program comprising computer program code arranged to be stored in working memory and processed by one or more processors.

A non-transitory computer-readable storage medium comprising a set of computer-readable instructions stored thereon, may be used which, when executed by a processing system, cause the processing system to perform a method according to the first example.

According to a second example described herein, there is provided a client computing device comprising a storage interface for communicatively coupling the client computing device to at least one local non-volatile storage device, a network interface for communicatively coupling the client computing device to a server computing device over one or more networks, the server computing device having access to at least a portion of a remote virtual machine disk image comprising a first set of data arranged in a first sequence, a communication manager arranged to receive data corresponding to the remote virtual machine disk image from the server computing device via the network interface and to store said received data as a local virtual machine disk image in said at least one storage device and a virtual machine manager arranged to implement a virtual machine on the computing device using the local virtual machine disk image stored in said at least one storage device, wherein the communication manager is further arranged to receive a second set of data from the server computing device, the second set of data comprising at least a portion of the first set of data arranged in a second sequence, the second sequence being different from the first sequence.

According to a third example described herein, there is provided a server computing device comprising a network interface for communicatively coupling the server to one or more networks and a communication manager arranged to instruct, via the network interface communication of data corresponding to a virtual machine disk image to a client computing device, at least a portion of the virtual machine disk image comprising a first set of data arranged in a first sequence, wherein the communication manager is further arranged to instruct communication of a second set of data to the client computing device, the second set of data comprising at least a portion of the first set of data arranged in a second sequence, the second sequence being different from the first sequence.

Further features and advantages of the invention will become apparent from the following description of certain examples, which is made with reference to the accompanying drawings.

DETAILED DESCRIPTION OF THE INVENTION

Figure 1A:
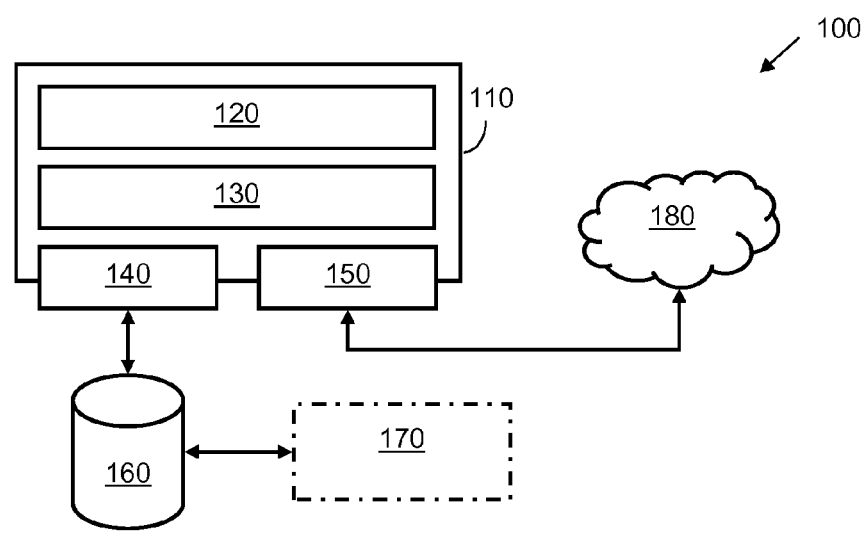
FIG. 1A is a schematic drawing showing a client computing device according to an example.

Certain examples described herein provide at least one of methods, apparatus and systems for communicating data representative of a virtual machine disk image from a server computing device to a client computing device. Various examples enable a client computing device to make use of a local virtual machine disk image, data representative of the local virtual machine image being either accessed locally or retrieved from a remote server computing device. In these cases, a time taken to retrieve data representative of at least a portion of a virtual machine disk image over a network may be decreased, thus enabling a faster provisioning of controlled virtual machines that operate on user-owned, host computing devices.

FIG. 1 shows a client computing device 110 according to an example 100. FIG. 1 is a schematic drawing and as such may not feature all components of the client computing device, e.g. certain components of a practical client computing device may be omitted in FIG. 1 so as to better explain the example. Additionally, other examples may omit, add, combine and/or modify certain components of FIG. 1 as required by the implementation.

In FIG. 1 the client computing device 110 comprises a virtual machine manager 120, a communication manager 130, a storage interface 140, and a network interface 150. These components may be implemented in software, hardware and/or a combination of both software and hardware, e.g. one or more of the interfaces may comprise one or more physical couplings as well as control hardware and software to allow access to one or more internal and/or external devices.

In the example of FIG. 1, the storage interface 140 communicatively couples the client computing device 110 to a local non-volatile storage device 160. The storage device 160 may be internal or external to the client computing device 110. In one example, the storage device 160 is a magnetic and/or solid state hard drive installed in the client computing device 110. In certain implementations, the storage device 160 may comprise a plurality of storage devices, e.g. comprise a logical drive wherein data is stored across one or more physical storage devices. In the present example, "local" may denote a communicative coupling that enables operation even if a network connection is absent. In FIG. 1, the storage device 160 stores a virtual machine disk image 170 that enables the virtual machine manager 120 to implement a virtual machine. The virtual machine disk image 170 may be accessed via a local coupling that is at least in part implemented by the storage interface 140. As described later with reference to FIG. 9, the virtual machine disk image may be a skeleton virtual machine disk image. The virtual machine disk image 170 may be encrypted such that it cannot be accessed and/or used to implement a virtual machine until a user has been authenticated and/or authorised by an entity controlling the virtual machine operation.

In the example of FIG. 1, the network interface 150 communicatively couples the client computing device 110 to one or more networks 180. These networks may be wired and/or wireless, and may comprise local area networks (LAN) and/or wide area networks (WAN). In certain implementations, one of the networks may comprise a collection of public networks such as "the Internet". In these cases, a network connection may comprise a virtual private network (VPN) connection, e.g. a secure connection, that is established between the client computing device 110 and one or more other network devices. The one or more networks 180 may comprise intermediate network devices such as routers, switches, servers etc. In use, the communication manager 130 controls the communication of certain data via the network interface 150 and the one or more networks 180.

The virtual machine manager 120, which may alternatively be called a virtual machine monitor or "hypervisor", controls a virtual machine that is implemented on the client computing device 110. In the present example, the virtual machine manager 120 is a type 2 hypervisor, e.g. one that runs on an operating system of a host device; however, in other implementations a type 1 hypervisor may alternatively be used, e.g. one that runs directly on the hardware of the client computing device. Known hypervisors are supplied by, amongst others, VMware Incorporated of California, United State of America. The virtual machine manager 120 may be adapted, or complemented with additional software to perform the functions described herein. The virtual machine may emulate a computer architecture, e.g. hardware interfaces and/or a processor instruction set, in software, e.g. in computer program code that is processed by one or more processors of the client computing device 110, said computer program code being loaded into a working memory. This is demonstrated schematically in FIG. 1B.

Figure 1B:
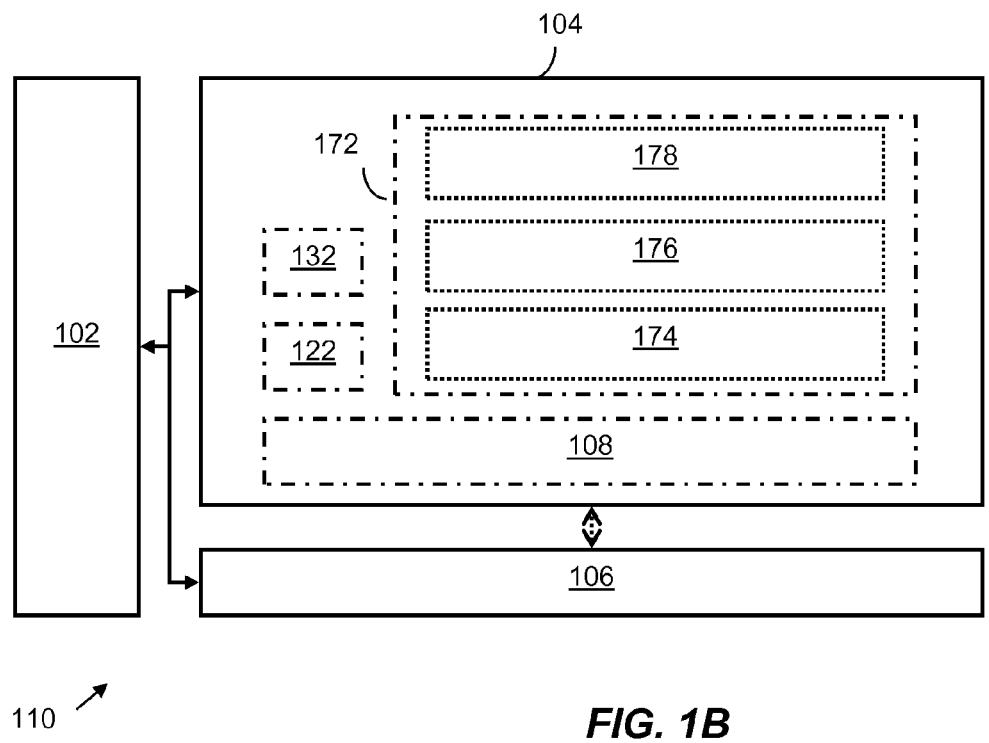
FIG. 1B is a schematic drawing showing a client computing device according to an example.

FIG. 1B shows one or more processors 102 of the client computing device 110 that are communicatively coupled to working memory 104. Working memory 104 may comprise a portion of random access memory (RAM). Working memory 104 may be volatile memory, e.g. the contents of the working memory may be lost when a power supply is removed. FIG. 1B also shows one or more hardware interfaces 106 that are communicatively coupled to the one or more processors 102. Direct memory access (DMA) may also be used to communicatively couple the one or more hardware interfaces 106 to the working memory 104. The one or more hardware interfaces 106 communicatively couple, for example by way of a system bus, the one or more processors 102 (and/or working memory 104) to one or more peripheral devices, which may include, amongst others: video memory; one or more displays; one or more input peripherals such as mice, keyboards, touch-screens, tablets etc.; one or more non-volatile storage devices such as storage device 160; one or more printers; speakers; microphones; and media drives such as flash, compact or digital versatile disk drives. In use the one or more processors 102 (and/or working memory 104) send and/or receive data using the one or more hardware interfaces 106 to said peripheral(s).

FIG. 1B shows the contents of working memory 104 at one point in time during use of the client computing device 110. One portion of working memory 104 is loaded with computer program code 108 to implement an operating system of the client computing device 110. For example, the operating system of the client computing device 110 may have one or more drivers that control the physical hardware of the client computing device 110, e.g. via hardware interfaces 106. In this example, a second portion of working memory is loaded with computer program code 122 to implement the virtual machine manager 120 and a third portion of working memory is loaded with computer program code 132 to implement the communication manager 130. Also shown in FIG. 1B is a fourth portion of working memory 104 that is loaded with computer program code 172 to implement the virtual machine. The computer program code 172 may be loaded from the virtual machine disk image 170 that is stored on storage device 160. This computer program code 172 may in turn comprise computer program code 174 to implement an abstraction of a hardware layer of the emulated computer architecture. For example, computer program code 174 may provide a virtual version of one or more hardware interfaces. This virtual hardware interface may in certain cases be arranged to pass data to and/or receive data from the operating system of the client computing device 110, the operating system of the client computing device 110 in turn accessing physical hardware interfaces 106. This process is transparent to the virtual machine, which "believes" it is accessing hardware directly. The computer architecture of the virtual machine may be configurable and/or may differ from the computer architecture of the client computing device 110. The virtual machine implemented by the virtual machine manager 120 may provide a system platform for an operating system in addition to an operating system of the client computing device 110. This is shown as computer program code 176 in FIG. 1B. The operating system implemented by the virtual machine may have one or more drivers that interact with software abstractions of a given computer architecture. The operating system implemented by the virtual machine may differ from the operating system of the client computing device 110; for example it may comprise an operating system supplied by a different entity, a different version of an operating system and/or a different operating system configuration. In FIG. 1B, the computer program code 172 used to implement the virtual machine also comprises a portion 178 of working memory 104 that operates as an application space for the operating system of the virtual machine. An advantage of a virtual machine is that this application space is separated, e.g. "sandboxed", from an application space and operating system of the client computing device 110, e.g. exists within the virtual boundary of computer program code 172. This prevents malicious applications in the application space of the virtual machine from corrupting the application space and/or operating system of the client computing device 110. In addition, write operations performed by the virtual machine may act upon the virtual machine disk image 170, rather than directly on storage device 160. Hence, corruption of data on storage device 160 that, for example, is used by the operating system of the client computing device 110 may be avoided.

As set out above, a client computing device 110 according to an example implements a virtual machine based on a locally-stored virtual machine disk image. The locally-stored virtual machine disk image may be retrieved, in whole or in part, from a server computing device. Examples of a server computing device are shown in FIGS. 2A and 2B.

Figure 2A:
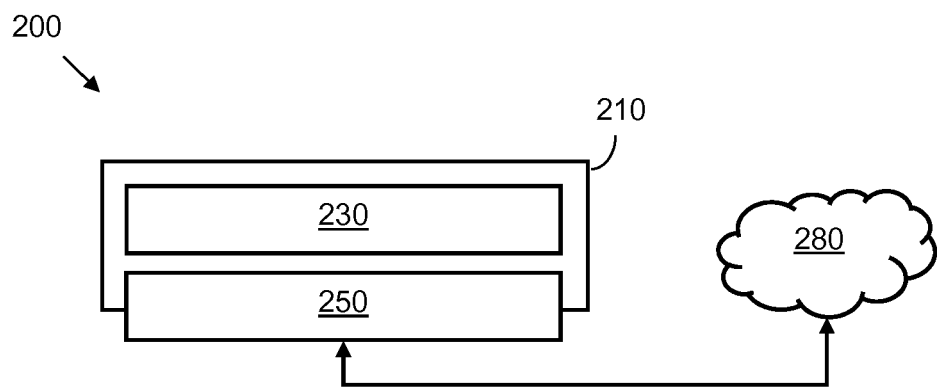
FIGS. 2A and 2B are schematic drawings showing a server computing device according to two respective examples.

FIG. 2A shows a first example 200 of a server computing device 210. The server computing device 210 comprises a communication manager 230 and a network interface 250. As discussed previously, these components may be implemented in software, hardware and/or a combination of both software and hardware. For example, network interface 250 may comprise one or more physical couplings as well as control hardware and software to allow access to one or more internal and/or external devices. Similarly communication manager 230 may be implemented in whole or in part by computer program code processed by one or more processors of the server computing device 210, said computer program code being loaded into working memory accessible to said processors. The network interface 250 communicatively couples the server computing device 210 to one or more networks 280. The one or more networks 280 may be the same as, overlap with and/or be coupled to the one or more networks 180. These networks may be wired and/or wireless, and may comprise local area and/or wide area networks. In certain implementations, one of the networks may comprise a collection of public networks such as "the Internet". In these cases a network connection may comprise a virtual private network (VPN) connection or similar, e.g. a secure connection, that is established between the server computing device 210 and the client computing device 110. The one or more networks 280 may comprise intermediate network devices such as routers, switches, servers etc. In use, the communication manager 230 controls the communication of certain data via the network interface 250 and one or more networks 280. The communication manager 230 is arranged to instruct the supply of data representing at least a portion of a virtual machine disk image to the client computing device 110 over the one or more networks 180.

Figure 2B:
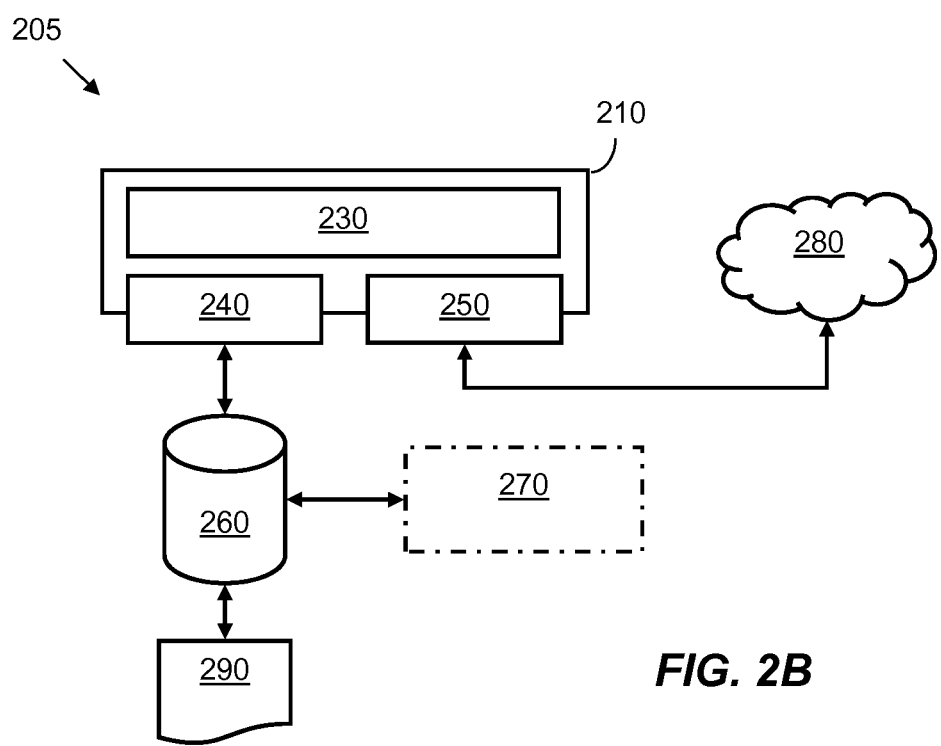

FIG. 2B shows a second example 205 of a server computing device 210. In this case, as well as network interface 250, the server computing device 210 comprises a storage interface 240 that communicatively couples the server computing device 210 to at least one storage device 260. The storage device 260 may be local to the server computing device 260 and/or part of a distributed set of non-volatile storage accessible to the server computing device 260. It may comprise one or more physical and/or logical storage devices. In FIG. 2B, the storage device 260 stores a virtual machine disk image 270 and configuration data 290. This may differ from FIG. 2A where data representing at least a portion of a virtual machine disk image may be stored in a third network location separable from both the client computing device 110 and the server computing device 210. In the example of FIG. 2B, the communication manager 230 is arranged to supply data representing at least a portion of a virtual machine disk image 270 to the client computing device 110 via the network interface 250 and the one or more networks 280. The supply of this data to a particular client computing device may be performed according to one or more parameters associated with said particular device that form part of the configuration data.

Figure 3:
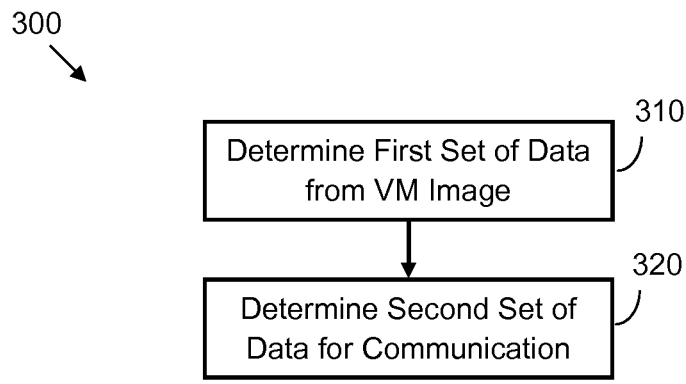
FIG. 3 is a flow chart showing a method of communicating data representative of a virtual machine disk image according to an example.

FIG. 3 shows a method 300 of communicating data representing at least a portion of a virtual machine disk image to a client computing device. For example, this may be communication to the client computing device 110 shown in FIG. 1A. The communication may be performed under the control of, and/or from, the server computing device 210 of either one of FIGS. 2A and 2B. Alternatively, the method 300 of FIG. 3 may be implemented by an electronic device other than the devices described herein.

Turning to the method 300 of FIG. 3, at block 310 a first set of data represented by a virtual machine disk image is determined. For example, if a virtual machine disk image is stored as a file that is accessible to a client computing device via a network connection, then at least a portion of this file may be analysed. The first set of data comprises data arranged in a first sequence. For example, the first set of data may comprise a one-dimensional array of bits and/or bytes, which may be stored in a plurality of associated data blocks. Block 310 may comprise determining the first sequence, e.g. determining a structure of the data storing the virtual machine disk image. In a comparative example, the first set of data represents the data that is communicated to a client computing device, e.g. the first sequence is the sequence in which bytes of a virtual machine disk image are communicated across a network. This may represent the order of bits and/or data in a binary file representation of the virtual machine disk image. In certain cases, the first set of data and the first sequence may also represent a compressed form of a virtual machine disk image, wherein the order of the compressed data is derived from the order of the virtual machine disk image. In one comparative example, said bytes are transmitted across the network to the client device in the first sequence until the total content of the virtual machine disk image is downloaded to the client computing device. In comparison to this example, the present method determines a second set of data for communication to the client computing device. This is shown in block 320.

At block 320, a second set of data for communication to the client computing device over the network is determined. This second set of data comprises at least a portion of the first set of data arranged in a second sequence, where the second sequence is different from the first sequence. For example, the second set of data may comprise a subset of the first set of data and/or may have a different order to the first set of data. In this example, the second set of data, as opposed to the first set of data, is communicated to the client computing device. The client computing device may then use this second set of data to construct a virtual machine disk image that in turn allows the implementation of a virtual machine on the client computing device.

Figure 4:
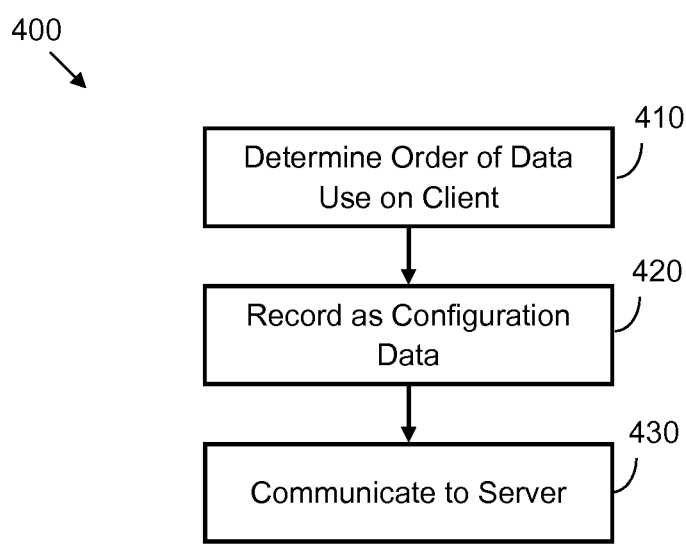
FIG. 4 is a flow chart showing a method of generating configuration data according to an example.
Figure 5:
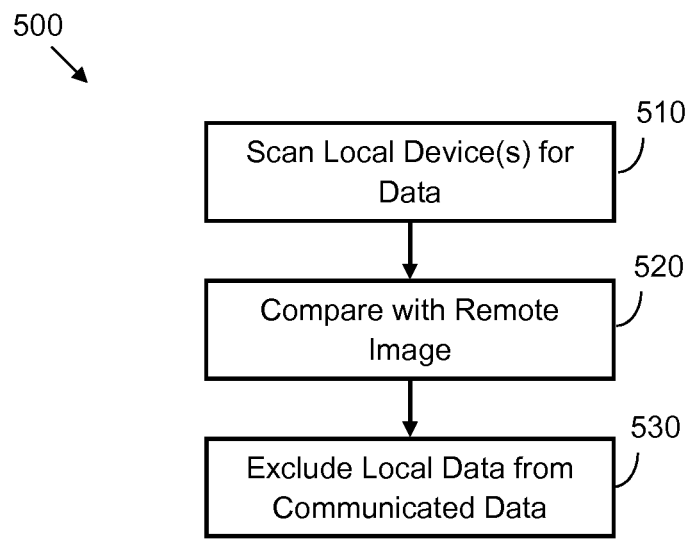
FIG. 5 is a flow chart showing a method of determining a set of data for communication according to an example.

FIGS. 4 and 5 show examples of particular implementations of the method of FIG. 3. The methods of FIGS. 4 and 5 may be used individually or implemented together.

FIG. 4 shows a method 400 of determining a second set of data for communication to a client computing device. For example, it may be used as part of block 320 in FIG. 3. At block 410 an order of use for the first set of data on the client computing device is determined. For example, this may be determined by one or more test configurations wherein a full virtual machine disk image associated with the first set of data is installed on a test client computing device and local access is monitored. Alternatively, it may be determined based on a known boot sequence or specification, e.g. it may be known that a particular set of files stored in a virtual machine disk are accessed during boot and these files or their equivalent data locations in the virtual machine disk image may be recorded. At block 420, the order of use determined at block 410 is stored as configuration data for one or more client computing devices. For example, it may be stored as configuration data 290 as shown in FIG. 2B. The configuration data may list the files as identified above, or corresponding data locations in the virtual machine disk image. If one or more files are identified these may be mapped to data locations in the virtual machine disk image during use. In one case, the configuration data may comprise different configuration files for different virtual machine configurations, e.g. a first version of an operating system may use a different set of files, and/or a different order of use, than a second version of an operating system. At block 430, the configuration data is communicated to a server computing device. The server computing device may be the server computing device 210 of FIG. 2B. In certain cases, configuration data may be gathered on one or more client computing devices such as those shown in FIG. 1A and communicated to the server computing device over networks 180, 280. The server computing device may then use the configuration data to set a second sequence for the download of data associated with a virtual machine disk image to be supplied to a client computing device.

As well as, or instead of, an order of use as determined in block 410 of FIG. 4, other configuration data may be used to determine a second set of data for transmission to a client computing device. For example, in one case the configuration data for a client computing device may identify one or more of an operating system of a virtual machine that is implemented using the virtual machine disk image and a profile associated with a user of the client computing device. As discussed above, one operating system may require a different set of files from another operating system, and/or possibly the same files in a different order (or a combination of the two), this information may be used to set the order in which the second set of data is transmitted to the client computing device, this order being different from the order of the first set of data that represents the virtual machine disk image. The order may be based on a standard boot sequence for an operating system.

In one implementation an order of use may be indicated in metadata associated with a virtual machine disk image. For example, a class of use in a plurality of classes may be associated with a particular data portion of virtual machine disk image. In one case, the classes may be "retrieve sooner", "unmarked" and "retrieve later", the classes denoting an order for download. For example, "retrieve sooner" may be applied to data portions associated with particular files that are known to be regularly used, such as core system files (e.g. particular dynamic-link library (DLL) files for a Microsoft Windows® operating system). Comparatively, "retrieve later" may be applied to data portions associated with particular files that are known to be rarely used, such as particular log files. As well as, or instead of, use an order may be applied based on usefulness, e.g. there may be certain files such as log files that are not required for successful operation. The configuration data may also comprise an ordered list of request-likelihood over time.

FIG. 5 shows another method 500 of determining a second set of data for communication to a client computing device. For example, it may be used as part of block 430 in FIG. 3, together with, or independently of, the method 400 of FIG. 4. If performed together the methods may be performed in any order, e.g. method 500 may be used to further refine the output of method 400 or vice versa. At block 510, a local device is scanned. This may comprise scanning and/or processing a storage device such as storage device 160 that is locally-accessible to the client computing device. Block 510 may comprise determining a checksum for particular files and/or blocks of data on the storage device. At block 510, the whole or part of a storage device may be scanned, for example a scan may be limited to a particular folder structure and/or used data blocks and/or sectors. At block 520, the results of block 510 are compared against a virtual machine disk image. For example, this may be the virtual machine disk image 270 that is stored remotely for download to the client computing device. The comparison may involve comparing checksums for particular files and/or blocks of data represented in (or by) the virtual machine disk image. A checksum may comprise a cyclic redundancy check value. For example, in one case the virtual machine disk image may be split into a number of portions or packets and compressed. The compression operation may automatically generate a checksum. These checksums may then be compared with the checksums generated in block 510. In one implementation, analysis of a local device may repeat, in whole or in part, a division and/or compression operation performed on the virtual machine disk image. At block 530, data identified as being located on a storage device that is locally-accessible to the client computing device is excluded from the first set of data referred to in block 310 of FIG. 3. This determines at least part of the second set of data referred to in block 320 of FIG. 3. For example, if a checksum generated from a local storage device matches a checksum generated from a remote virtual machine disk image, the data portions or packets associated with the checksum is omitted from data transmitted to the client computing device. In other cases, or in addition to the example above, at least one of the name, date, time and size of particular files may be used to look for matches between local data and data in a remote virtual machine disk image. In certain implementations a series of checks may be made, for example a coarse check based on one or more of name, date, time and size may be performed and potential matches from said coarse check used for a fine check based on checksum values.

The checksums described above may be generated automatically as metadata for particular data portions. For example, if a Windows Imaging Format (WIM) is used to produce a disk image, one or more checksums may be determined automatically and stored as file-system metadata. In this case, block 510 may comprise generating a disk image for a local storage device and then comparing any checksums within the metadata for this disk image with checksums generated during compression of the remote virtual machine disk image. For example, in certain implementations a WIM image may comprise a compressed version of a virtual machine disk with a set of metadata outlining the disk structure and including one or more checksums. In certain cases, the metadata may be used for a coarse check as described above. A checksum for an uncompressed virtual machine disk image may be determined rapidly by retrieving a value from the metadata for the compressed image. The checksum may also be used following transmission across a network to ensure that any transmitted data was not corrupted in transit.

In certain implementations blocks 510 and 520 may be performed in a different order. For example, a list of checksums associated with a remote virtual machine disk image may be downloaded to a client computing device; the scan performed at step 510 may then be undertaken to locate data contained in said list.

A number of examples will now be described where the above-described methods are applied to the above-described apparatus.

Figure 6A:
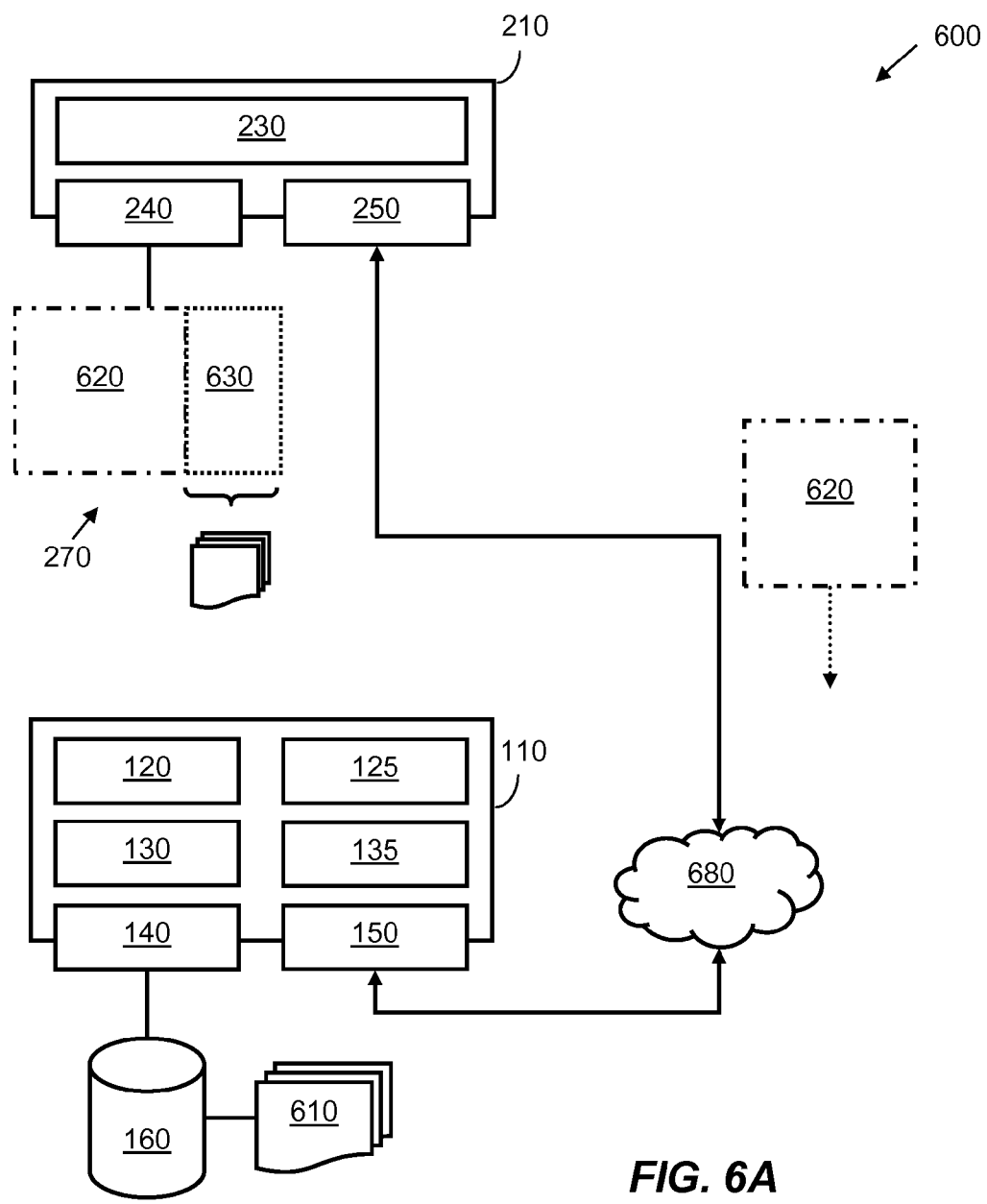
FIGS. 6A and 6B are schematic drawings showing a server computing device in communication with a client computing device according to an example.
Figure 6B:
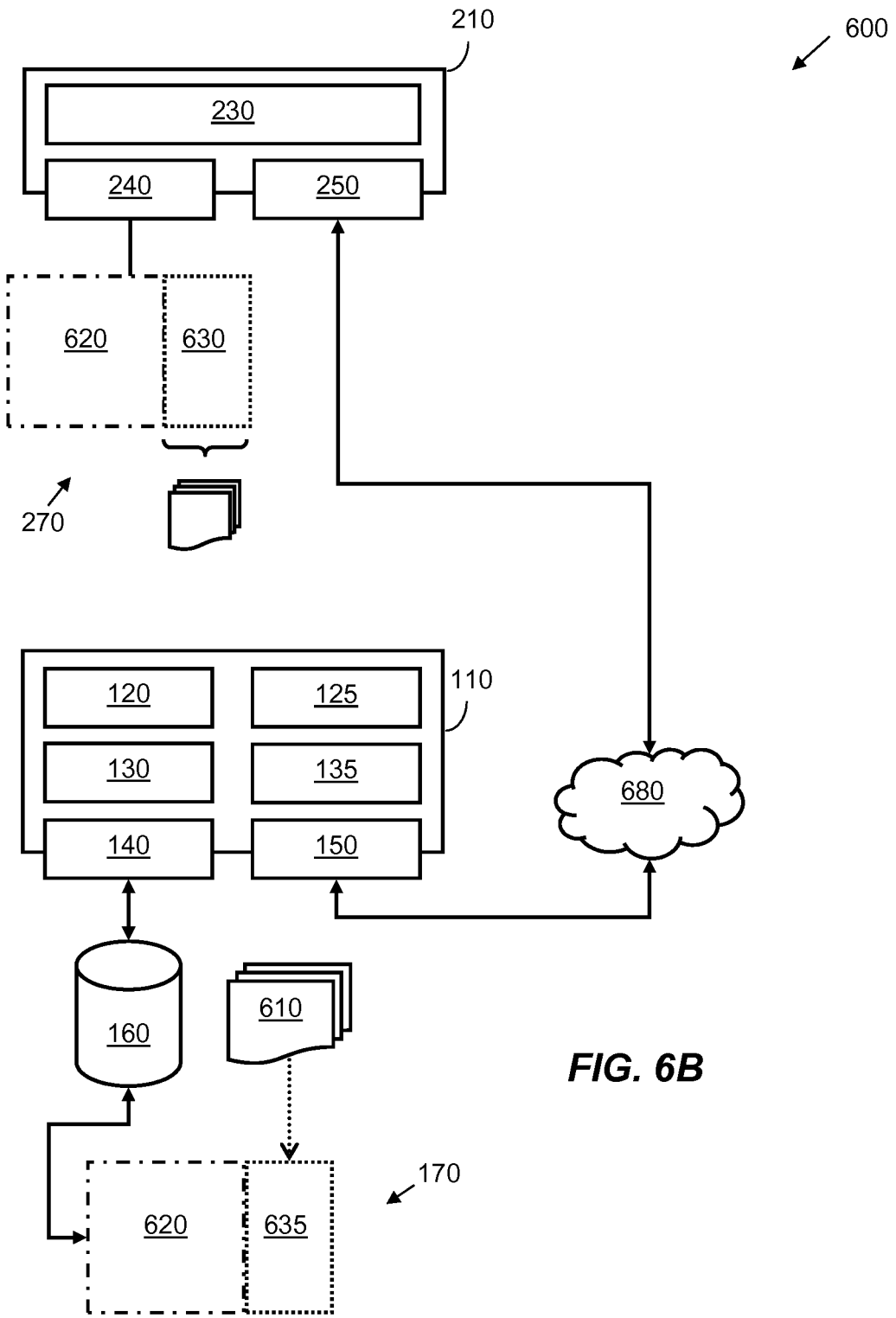

FIGS. 6A and 6B show a first example 600 where a portion 620 of a virtual machine disk image 270 is downloaded from a server computing device 210 to a client computing device 110 over one or more networks 680. In this example, features that are shared with the examples of FIGS. 1A and 2A are given the same reference numerals. In the first example 600, as well as virtual machine manager 120 and communication manager 130, the client computing device 110 comprises data manager 125 and virtual machine disk manager 135. The data manager 125 is arranged to scan storage device 160. In the example 600, the storage device 160 comprises data in the form of one or more files 610. These files may, for example, comprise system files to implement an operating system of the client computing device 110. The data manager 125 is arranged to scan the storage device 160 to determine whether the one or more files 610 corresponds to data present in a remote virtual machine disk image 270. In this example "remote" refers to the fact that a network connection is required at the client computing device to access the virtual machine disk image 270. The virtual machine disk image 270 may be locally-accessible to the server computing device 210, for example as shown in FIG. 2B. In one implementation the data manager 125 may be arranged to determine at least one checksum for one or more portions of data corresponding to the one or more files 610. The data manager 125 may access the storage device 160 via the storage interface 140. Both data manager 125 and virtual machine disk manager 135 may be implemented by computer program code in a similar manner to virtual machine manager 120 and communication manager 130 as shown in FIG. 1B. The data manager 125 may download a list of checksum values associated with the virtual machine disk image 270 from the server computing device 210. The data manager 125 may then indicate, with reference to this list, which portions of the virtual machine disk image 270 have been located on the storage device 160. This indication may then be returned to the server computing device 210 or used locally by the client computing device 110. In another implementation any checksums calculated locally by the data manager 125 may be transmitted to the server computing device 210, wherein a comparison may be performed by the server computing device 210.

In one implementation, the communication manager 230 of the server computing device 210 determines a second set of data corresponding to the virtual machine disk image 270 for transmission to the client computing device 110. For example, the communication manager 230 may use any received or generated indication of checksum matches to select a portion 620 of the virtual machine disk image 270 for transmission, the portion 620 excluding data 630 corresponding to the one or more files 610 as shown in FIG. 6A. In another implementation, the communication manager 130 of the client computing device 110 may use any received or generated indication of checksum matches to instruct download of the portion 620 of the virtual machine disk image 270 from the server computing device 210. Retrieval of the portion 620 may occur as one process, e.g. as one download operation, or as a series of operations. In FIG. 6A it can be seen that a first sequence of the original complete virtual machine disk image 270 is different from a second sequence of the portion 620, the difference being at least the exclusion of data 630 corresponding to the local files 610.

FIG. 6B shows how the virtual machine disk manager 135 may use the downloaded portion 620 of the virtual machine disk image 270 to generate a local virtual machine disk image 170 for use by the virtual machine manager 120 in implementing a virtual machine. This may comprise using data representative of the one or more files 610 as data representative of the virtual machine disk image 635. This data then may be accessed in combination with data representative of the virtual machine disk image 620 that has been downloaded over the network 680. Alternatively, it may comprise otherwise combining the two sets of data, such as mounting an initial virtual machine disk image generated based on the portion 620 and then adding the files to the mounted virtual machine disk image to generate a final virtual machine disk image 170.

Figure 7:
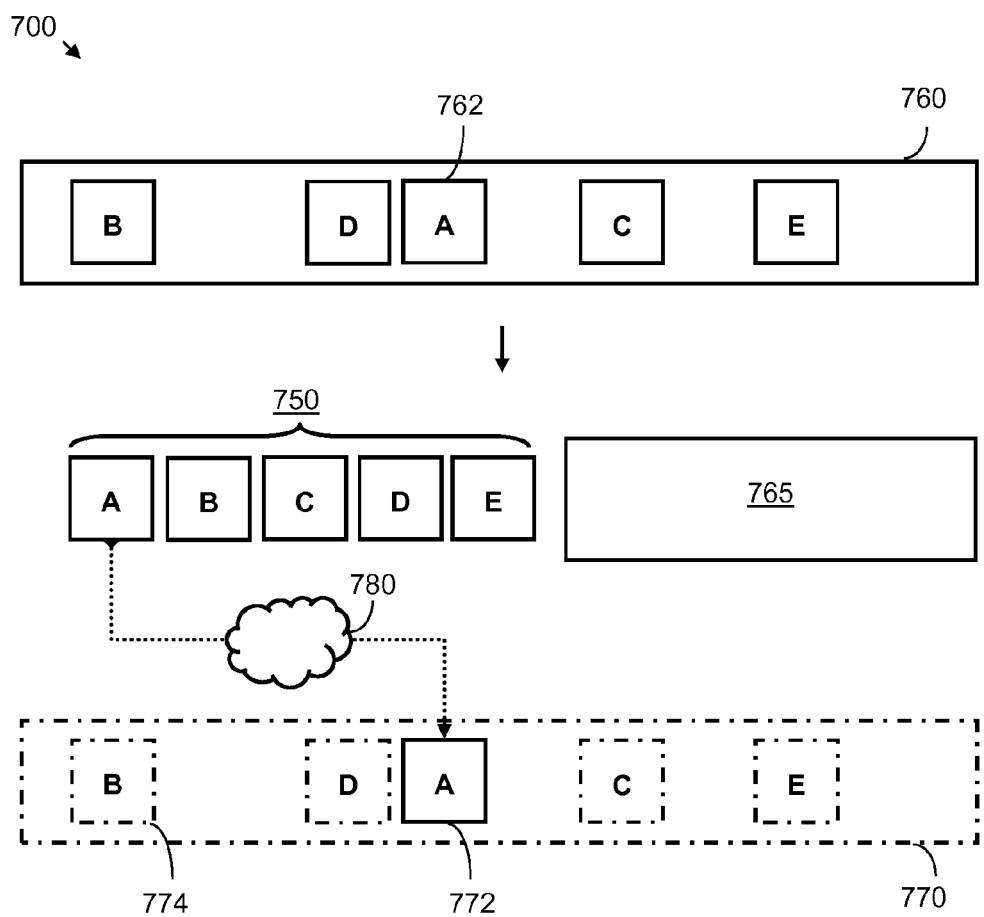
FIG. 7 is a schematic drawing showing communication of data to a client computing device according to an example.

FIG. 7 shows another example 700 whereby a remote virtual machine disk image 760, i.e. one managed by a server computing device, is modified for transmission to a client computing device. The remote virtual machine disk image 760 comprises a number of data portions 762; in the present example five are shown as denoted by the letters A to E. The determination of data portions 762 may be performed as part of block 310 in FIG. 3. In FIG. 7 the remote virtual machine disk image 760 is processed to determine a transmission order 750 for the data portions. This transmission order 750 may be determined in block 320 of FIG. 3. It may be based on, for example, configuration data for a client computing device. As shown in FIG. 7, when part of the remote virtual machine disk image 760, data portions 762 have a first order B, D, A, C and E and are distributed within the file space of the disk image. Following processing, the data portions 762 are ordered for transmission in a second order A, B, C, D, and E. Data corresponding to the remote virtual machine disk image 760 that is not included in the transmission order 750 is shown as data portion 765 in FIG. 7. In certain implementations that combine the methods of FIGS. 4 and 5, the data portion 765 may comprise data portion 630 as shown in FIGS. 6A and 6B, i.e. a portion that is not transmitted to a client computing device. In other implementations, the processing of the remote virtual machine disk image 760 may be iteratively repeated on the data portion 765.

FIG. 7 also schematically illustrates the transmission of the first data portion 762-A over one or more networks 780 to form part of a local virtual machine disk image 770. In one implementation, transmission of data portions 762 may occur as part of a controlled download sequence. In another implementation, transmission of data portions 762 may occur as portions of the local virtual machine disk image 770 are requested during implementation of a virtual machine by virtual machine manager 120. For example, in response to, or to pre-empt, a write request to data portion 772 in the local virtual machine disk image 770, a client computing device, e.g. communication manager 130, may request transmission of data portion 762. As a virtual machine boots, subsequent data portions 774 may then be transmitted in turn. The data portions may be compressed. This method may be used to populate the complete local virtual machine disk image 770 in stages during implementation of a corresponding virtual machine.

In the examples described herein that modify an order in which data associated with the virtual machine disk image is downloaded, the download process may take place as a background process. For example, if one or more metrics such as processor capacity and/or available bandwidth on the client computing device, either generally or while implementing a virtual machine, exceed one or more given thresholds a request for data associated with the virtual machine disk image may be made.

Figure 8A:
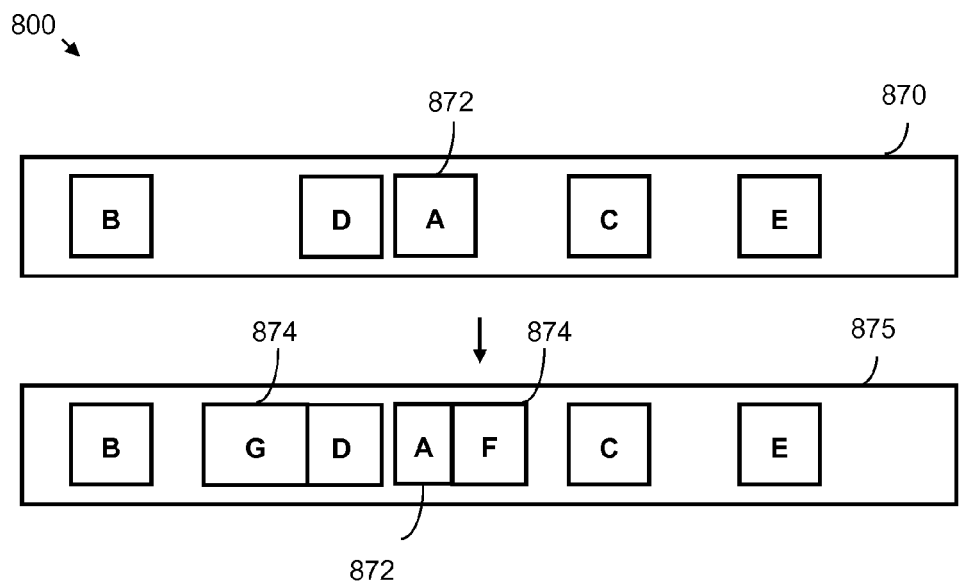
FIGS. 8A and 8B are schematic drawings showing use of a difference layer according to an example.
Figure 8B:
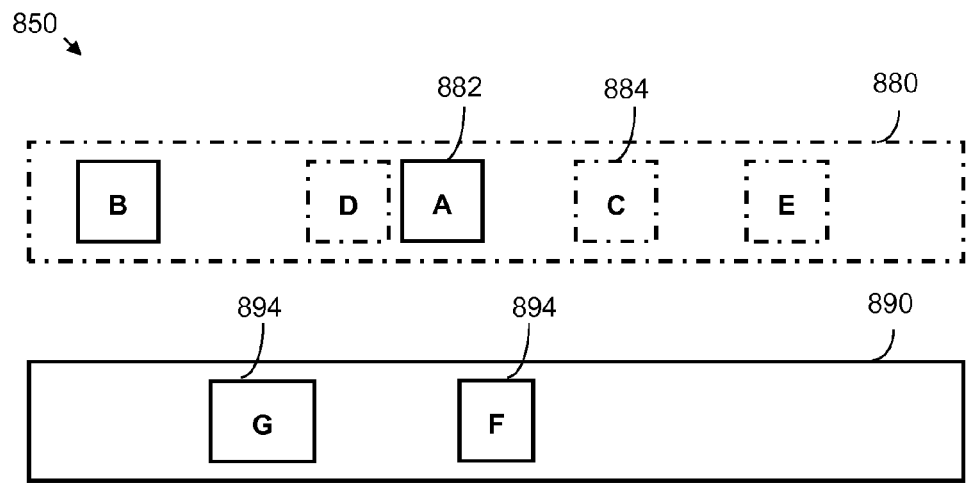

FIGS. 8A and 8B demonstrate how the methods described herein may be used in combination with one or more so-called differencing or snapshot layers. FIG. 8A shows how read operations may be performed on a local virtual machine disk image 870. The local virtual machine disk image 870 in this example 800 may reflect an image that has been downloaded from a remote location. As writes are performed within the virtual machine, which within the virtual machine may be seen as write operations to a physical disk drive, data is written to additional portions 874 of the local virtual machine disk image 875. This is shown in the lower section of FIG. 8A. As writes are made the local virtual machine disk image 875 begins to differ from the remote virtual machine disk image, e.g. 270 or 760. If the local virtual machine disk image 875 becomes corrupted or compromised it may be wiped and/or deleted and replaced with a new local version of a downloaded remote virtual machine disk image.

FIG. 8B shows how write operations may be made to a differencing layer 890. The differencing layer 890 comprises a version of the local virtual machine disk image 875 that in combination with a "gold image" or representation of a remote virtual machine disk image 880 results in a modified virtual machine disk image equivalent to image 875 in FIG. 8A. For example, in FIG. 8B write operations are made to the differencing layer 890. This then writes data portions 894 to the differencing layer 890, these portions corresponding to the portion 874 in FIG. 8A. When a read operation is requested, the differencing layer 890 is inspected first. If data has been written to the differencing layer 890 in the requested data location, e.g. data portions 894, then the data is read from the differencing layer 890. If data has not been written to the differencing layer 890 in the requested data location, then a read request is made to the gold image 880. In one implementation, a gold image is incrementally downloaded from a remote location in the manner described with reference to FIG. 7. For example, at a time of a write request not all of the gold image may yet be present locally at the client computing device, e.g. in FIG. 8B only data portion 882 is available locally, whereas data portions 884 are still to be retrieved.

In certain cases, a virtual machine disk image to be downloaded to a client computing device may comprise a gold image and a differencing image or layer. For example, a particular user configuration may be applied to the gold image by way of the differencing image. In this case, the methods described herein may be applied to each of the gold image and the differencing image, either separately or in combination. In certain implementations of the above examples, where a read request is made for a data portion or block that is not stored locally, the read request may be forwarded to a remote virtual machine disk image. Data relating to the read request that is stored in the remote virtual machine disk image may be compressed and transmitted to the client computing device. On receipt they may form part of a local virtual machine disk image.

As described previously, a download operation may take place as a background process when certain criteria are met. One criterion may be a particular break in disk access operations by the virtual machine operating system, e.g. a period of time between read and/or write operations that exceeds a given threshold.

Figure 9:
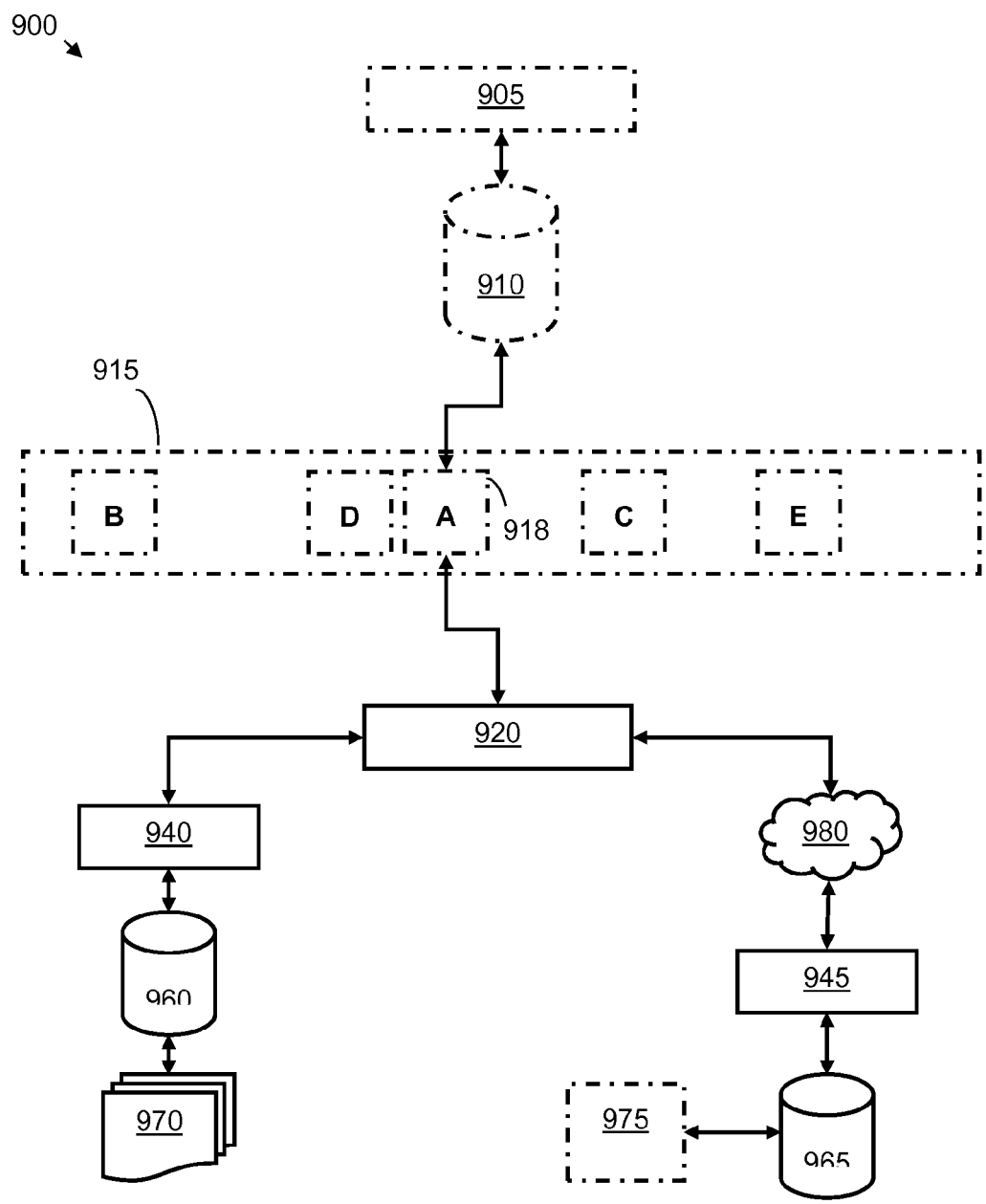
FIG. 9 is a schematic drawing showing an access operation on a virtual disk according to an example.
Figure 10:
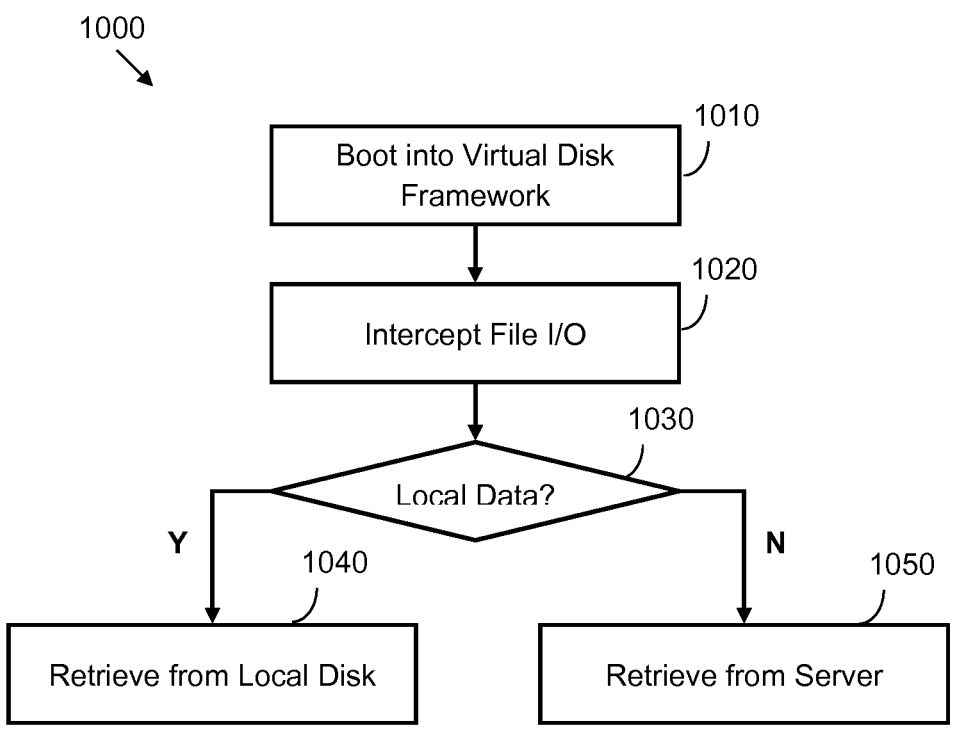
FIG. 10 is a flow chart showing an access operation on a virtual disk according to an example.

FIGS. 9 and 10 demonstrate an access operation on a virtual disk according to an example. The access operation may form part of a boot sequence for a client computing device such as client computing device 110.

FIG. 9 shows the system components 900 that are involved in an access operation according to an example. FIG. 9 shows a virtual operating system 905, e.g. an operating system implemented by a virtual machine as indicated by computer program code 176 in FIG. 1B. The virtual operating system 905 accesses a virtual disk 910. Inside the virtual machine, the virtual operating system 905 functions as if it was an operating system communicating with physical hardware, e.g. as if virtual disk 910 comprised at least a portion (e.g. a partition) of a physical hard disk. The virtual disk 910 is implemented by a virtual machine disk image, such as virtual machine disk image 170 in FIG. 1A.

FIG. 9 depicts an example set of interactions that take place when the virtual operating system 905 performs a read operation on virtual disk 910, i.e. requests data. In one case, a read operation may occur as part of a boot sequence for the virtual operating system 905 of the virtual machine. In other cases, the read operation may occur as part of normal operation of the virtual operating system 905. In the case of a boot sequence, a first read operation may comprise a first operation involving the virtual disk 910.

In FIG. 9 a skeleton virtual machine disk image 915 is shown. The skeleton virtual machine disk image 915 comprises a sparse file populated at least with metadata associated with the virtual machine disk image. The metadata in the sparse file may comprise a file system index for the virtual disk 910. In this context, a "sparse file" is a file wherein empty data blocks are represented by associated data rather than actually being written as empty data blocks; a full data block is written to disk only when the block contains non-zero (e.g. non-empty) data. During boot or operation the virtual operating system 905 acts to read data 918 from the virtual disk 910. A file system index stored within the skeleton virtual machine disk image 915 may indicate a location and/or file characteristics associated with data 918. In this case, a virtual machine manager 920, such as an adapted virtual machine manager 120 as shown in FIG. 1A, intercepts a disk input/output (I/O) request from the virtual operating system 905 at the host file level, e.g. at the level of the skeleton virtual machine disk image 915 as stored on the host computing device (such as computing device 110). In one implementation the interception may be performed by a storage layer forming part of one or more of the virtual machine manager 120, the storage interface 140 and an additional software agent installed on the client computing device. Assuming, for ease of explanation, that the interception is performed by the virtual machine manager 920, the virtual machine manager 920 then determines where to access data representing the requested data 918.

In the example of FIG. 9 there are two possible locations for the retrieval of data to fulfil the read operation. If the data is determined to be located locally on the client computing device then local data is read. In FIG. 9, this is performed using storage interface 940, which may comprise storage interface 140 as shown in FIG. 1A. The virtual machine manager 920 maps the requested data to a local disk location. Storage interface 940 then accesses a local storage device 960, which may comprise storage device 160 in FIG. 1A, to retrieve data 970 from the mapped local disk location. For example, in the case of the example of FIG. 6B, data 970 may comprise local files 610 if the requested data is available locally. If the data is determined not to be located locally on the client computing device then remote data is retrieved. In FIG. 9, a request is made over network 980, which may comprise network 180 as accessible via network interface 150, to server 945. The server 945 may comprise server computing device 210 as shown in FIG. 2A or 2B. Mapping between the requested data and a remote disk location may be performed by one or more of the virtual machine manager 920 and the server 945. The server 945 then retrieves the requested data from a communicatively coupled storage device 965. In FIG. 9 the data is retrieved from a compressed virtual machine disk image 975, for example a WIM file, stored on the communicatively coupled storage device 965. The server 945 then returns the remotely retrieved data to the virtual machine manager 920, which uses said data to fulfil the read operation. The remotely retrieved data may also now form part of data stored in a local disk location.

During and/or after a boot sequence a background process may download the second set of data, e.g. as described with regard to step 320 of FIG. 3. The background process may be managed by one or more of, amongst others, virtual machine manager 920, communication manager 130 from FIG. 1A, and an additional software agent. The second set of data may be ordered based on "retrieve sooner" and "retrieve later" tags or classes. Certain files may not have a tag or class. As such the interactions between virtual machine manager 920, network 980, server 945, storage device 965 and virtual machine disk image 970 may be repeated for, at first, data tagged "retrieve sooner". These interactions are thus ordered by the second sequence of the second set of data.

FIG. 10 shows a method 1000 of booting a client computing device according to an example. It may be used with the system components illustrated in FIG. 9 or other system components. At block 1010 a virtual machine is booted up. In one implementation, a user of a client computing device may access a web portal to download an executable that installs a virtual machine manager and a skeleton virtual machine disk image. The executable may also retrieve appropriate configuration data for the virtual machine from a server. This then minimises user interaction, e.g. the user does not require technical knowledge to configure the virtual machine. Once installed the virtual machine manager may be loaded and configured to boot into the skeleton virtual machine disk image. At block 1020 a file I/O request is intercepted. For example, as part of the boot sequence there may be a request for data indicated by the skeleton virtual machine disk image. This request is a request for data from a local storage device of the client computing device. This request may be intercepted by a storage layer that operates at a level of the operating system of the client computing device. The storage layer may be implemented by an agent installed by the executable on the client computing device, such as an operating system service or the like.

At block 1030 a check is made to determine whether this data is in fact stored locally. For example, the storage layer may check metadata associated with the skeleton virtual machine disk image to see whether a data block associated with the requested data is present on the storage device. The metadata may indicate whether the data block is empty or populated. In one case, the storage layer may access a mapping of the data block to another identical data block stored on the storage device. For example, if the data request is for data associated with a particular virtual operating system DLL file stored upon the virtual disk, it may be that the same DLL file is present on the storage device in association with a host operating system. In this case a storage layer may direct the read request to the data block storing the host operating system DLL file rather than a data block in the virtual machine disk image. Alternatively, the storage layer may determine that the request relates to a populated data block within the skeleton virtual machine disk image, for example a previously downloaded data block as described above. In any case, if the data can be retrieved locally this occurs at block 1040. If the data is not present locally then a request is made to a remote server at block 1050 to download the required data. The method 1000 may be repeated for each read request made as part of a boot operation.

The examples of FIGS. 9 and 10, which may be used in combination with the other described examples, enable a client computing device to boot into an "empty" or "skeleton" virtual disk that is stored on a local host. Files stored locally are retrieved locally, while files that are not stored locally may be retrieved over a network (e.g. from a WIM file over a WAN). This process may be performed in real-time. It may also be combined with a background data download process. Over time data is thus retrieved from a remote location to populate the "empty" or "skeleton" virtual disk. In certain cases, after a time, the entire virtual disk may be populated, e.g. a complete virtual machine disk image obtained. At this point, all virtual disk data is stored locally and a network connection is no longer required for operation, e.g. the virtual machine on the client computing device can be operated locally.

Certain examples described herein allow a user to use their own (client computing) device in a secure and/or controllable manner. A virtual machine disk image for a virtual machine is supplied to the user's device. The user's device may then implement the virtual machine. In this manner, a controlled network device (the virtual machine) may be provisioned even though an uncontrolled network device (the user's device) is used. As an example, a home teleworker may use a desktop or laptop computer supplied by Apple Incorporated of California, United States of America, said computer also using an operating system supplied by the same entity, to implement a virtual machine based on a Windows® operating system supplied by Microsoft Corporation of Washington, United States of America. The application software, operating system services and/or peripheral use, amongst others, on the latter virtual machine may be restricted, controlled and/or monitored. For example, printing of secure documents may be restricted by suitably configuring an abstracted print interface in the virtual machine (e.g. disabling said interface).

Certain examples described herein enable a user to install a local guest virtual machine and get it up and running quickly. In certain cases, only files that are needed at a particular time are retrieved across a network, for example as compared to cases that require a complete virtual machine disk image to be downloaded before a local guest virtual machine can be booted. In a test example using the techniques described herein, a virtual operating system in the form of Windows 7 was installed, booted, logged in to a remote office security domain and running a word processing application in under 10 minutes. This is approximately one hundred times faster than the time it would take to download the complete virtual machine disk image and avoids problems such as network connection timeouts. In this case a first set of data comprised a 15 GB virtual machine disk image and a second set of data (or at least a portion of a second set of data) comprised 150 MB of virtual machine disk data. The remaining data for the virtual machine disk image may then be copied as part of a background operation.

Certain examples described herein also allow other benefits. For example they may also address support and ownership problems with regard to a user's device. For example, if a user leaves an organisation or the user's device is stolen, a local virtual machine disk image may be remotely deleted from the user's device, e.g. using one of the client computing device components illustrated in FIG. 1A, 6A or 6B. In certain cases this may be performed remotely under the control of the server computing device. In this way, the user is no longer able to access and/or use sensitive information and/or products licensed to the organisation without needing to alter and/or return hardware associated with the user's device.

As described herein there may be provided a method for communicating data representative of a virtual machine disk image to a client computing device over a network comprising determining a first set of data representative of at least a portion of a virtual machine disk image accessible on the network, the first set of data comprising data arranged in a first sequence and determining, from the first set of data, a second set of data for communication to the client computing device over the network, the second set of data comprising at least a portion of the first set of data arranged in a second sequence, the second sequence being different from the first sequence.

Certain examples described herein address one or more problems with server-based virtualisation. By determining a second set of data for communication to a client computing device over a network, the second set of data being selected from a first set of data representative of at least a portion of a virtual machine disk image accessible on the network, a large virtual machine disk image may be more efficiently transmitted to a client computing device. This makes locally-hosted virtual machines more viable as a solution. Here "large" is relative to the average bandwidth of a network connection used by the client computing device, for example a virtual machine disk image may be of the order of gigabytes whereas a network connection used for downloading the image may be of the order of megabits per second, i.e. the size of the image is (much) greater than the bandwidth per second.

In one case, the second sequence corresponds to an order of use of the first set of data on the client computing device. Here, by re-ordering the data that is transmitted to a client computing device, the client computing device is able to receive a portion of the virtual machine disk image that may be used for a successful boot before receiving the complete virtual machine image. In a comparative example, data required for success boot and/or operation (e.g. that is used relatively early in an operative sequence of the client computing device) may be located anywhere within the virtual machine disk image, and possibly towards the end of the file. Hence, in a comparative case, a user would need to wait for the complete virtual machine disk image to be downloaded before implementing the virtual machine. However, in certain cases herein a virtual machine may be implemented on the client computing device before a complete virtual machine disk image is downloaded, e.g. more rapidly than a case where a user is required to download the complete image before implementing the virtual machine.

In one case, determining the second set of data comprises obtaining an indication of data stored locally on the client computing device and excluding data stored locally on the client computing device that is present in the first set of data from the second set of data. In this case, data representing the virtual machine disk image that needs to be transmitted to the client computing device may be reduced in size, allowing faster receipt of said data. In a case where two versions of a common operating system are used, e.g. Microsoft Windows 7® and Microsoft Windows 8®, a 32-bit and 64-bit version, or a Home and Professional version of an operating system, there may be many common files; the present case would thus greatly reduce the size of the data to be downloaded to the client computing device. In a case where the virtual machine operating system differs from a host operating system, then the shared data may relate to, for example, operating-system-independent class libraries (e.g. in Java®). The two cases may also be synergistically combined, e.g. by first filtering the first set of data to exclude data stored locally on the client device, the processing time for the re-ordering operation may be reduced.

Certain examples described herein reduce and/or avoid problems with server-based virtualisation, e.g. remote access to a server-hosted virtual machine. For example, the requirement for a stable and persistent network connection during operation of the virtual machine may be avoided and/or reduced, e.g. once required data for a virtual machine disk image has been received by a client computing device it is possible for the device to operate in an off-line mode without a network connection. Also problems with remote graphics transfer, for example poor colour quality, user-interface latency and the need for low-resolutions as set by the bandwidth of any network connection may be reduced and/or avoided. By reducing the size of and/or time required for a virtual machine disk image download, a locally-hosted virtual machine may be implemented more rapidly.

A second sequence may be based on configuration data associated with at least one client computing device. This configuration data may be a file, e.g. an eXtended Markup Language (XML) file. The configuration data may be programmatically generated, e.g. generated automatically, or pre-created manually. If the configuration data is generated automatically it may be generated based on recorded use, e.g. using statistical analysis. The second sequence may be based on one or more of a profile associated with a user of the client computing device and an operating system of a virtual machine that is implemented using the virtual machine disk image. In the former case the profile may provide settings related to operating system services, peripherals and/or application programs, amongst others, that are required by a particular user of a client computing device. For example, a product engineer may require drivers for debugging hardware (e.g. serial and/or proprietary interfaces) that may not be required for a specification writer (who in turn may require a word processing application). In this case, a profile may be associated with a role, such as product engineer or specification writer, and this may be mapped onto data that is required for the virtual machine that needs to be included in the virtual machine disk image. The profile may also be used to determine an order of use; for example, the product engineer may require said drivers before a word processing application.

In certain implementations configuration data may indicate data portions of the virtual machine disk image that are not required. For example, if a virtual machine disk image comprises data associated with page files, deleted items, temporary files and/or hibernation data this may be excluded from the second set of data. The configuration data may form part of a set of configuration data for configuring the virtual machine to be used on the client computing device. In certain cases, the configuration data may also indicate data portions and/or files that should be taken locally from a storage device of the client computing device.

In certain examples, a particular virtual machine disk image accessible on the network is communicable to a plurality of client computing devices and a first client computing device has a different second sequence to a second client computing device. This, for example, may be the case where a common gold image is used to configure a plurality of virtual machines.

In an example, a client computing device comprises a storage interface for communicatively coupling the client computing device to at least one local non-volatile storage device, a network interface for communicatively coupling the client computing device to a server computing device over one or more networks, the server computing device having access to at least a portion of a remote virtual machine disk image comprising a first set of data arranged in a first sequence, a communication manager arranged to receive data corresponding to the remote virtual machine disk image from the server computing device via the network interface and to store said received data as a local virtual machine disk image in said at least one storage device and a virtual machine manager arranged to implement a virtual machine on the computing device using the local virtual machine disk image stored in said at least one storage device, wherein the communication manager is further arranged to receive a second set of data from the server computing device, the second set of data comprising at least a portion of the first set of data arranged in a second sequence, the second sequence being different from the first sequence. This client computing device may provide one or more advantages corresponding to those described above.

In one case, the second sequence corresponds to an order of use of the first set of data on the client computing device.

In one case, a data manager is arranged to scan said at least one storage device to determine whether data present in said at least one storage device corresponds to data present in the remote virtual machine disk image, wherein the second sequence excludes any data as determined by the data manager.

In one case, a virtual machine disk manager arranged to receive a determination of data present in said at least one storage device that correspond to data present in the virtual machine disk image and to use said data as the local virtual machine disk image. These cases provide advantages similar to the corresponding method cases described above.

In an example, a server computing device computing device comprises a network interface for communicatively coupling the server to one or more networks and a communication manager arranged to instruct, via the network interface, communication of data corresponding to a virtual machine disk image to a client computing device, at least a portion of the virtual machine disk image comprising a first set of data arranged in a first sequence, wherein the communication manager is further arranged to instruct communication of a second set of data to the client computing device, the second set of data comprising at least a portion of the first set of data arranged in a second sequence, the second sequence being different from the first sequence. This example provides a means to instruct the download of data associated with a virtual machine disk image. This server computing device may provide one or more advantages corresponding to those described above.

In one case, the communication manager is arranged to access configuration data corresponding to the client computing device, said configuration data determining said second sequence and indicating one or more of an order of use of the first set of data on the client computing device, an operating system of a virtual machine that is implemented using the virtual machine disk image, a profile associated with a user of the client computing device, one or more files present in the first set of data that are not required to successfully implement a virtual machine and one or more files stored locally on the client computing device that are present in the first set of data.

In one case, the communication manager is arranged to access configuration data for a plurality of client computing devices, a first set of client computing devices having different configuration data from a second set of client devices, the communication manager being arranged to instruct communication of data corresponding to the virtual machine disk image to the plurality of client computing devices.

In one case, the server computing device comprises a storage interface for communicatively coupling the server to at least one storage device, the at least one storage device storing at least one virtual machine disk image. In this case, the server computing device may form part of a Network-Attached Storage (NAS) device. In another case, the server computing device may instruct data transfer from a different NAS device. In another case, the client computing device may instruct data transfer from a NAS device without a server computing device. In one implementation, data associated with a remote virtual machine disk image may be stored in a distributed storage system, for example a peer-to-peer network. In this implementation data associated with a remote virtual machine disk image may be retrieved from one or more distributed devices, e.g. one or more peer computing device. In each case, download of data may be instructed according to examples described herein.

According to one example, a computer program comprising computer program code is provided that is arranged to be stored in working memory and processed by one or more processors, said computer program code implementing the methods and/or apparatus components described above. Although at least some aspects of the examples described herein with reference to the drawings comprise computer processes performed in processing systems or processors, this also extends to computer programs, particularly computer programs on or in a carrier, adapted for putting the examples into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

In the examples described above, communication to and from the client computing device, e.g. to and from a server computing or remote storage device may be secured and/or compressed. For example, a communication channel may be secured using public key cryptography, for example using a credential issuing server associated with an entity that is supplying the virtual machine disk image. A secure, e.g. encrypted, network connection enables a server computing or remote storage device to be located behind a firewall for an entity, whereas the client computing device may be outside said firewall. A compressed version of a virtual machine disk image may have a different disk structure from an uncompressed file (e.g. a first set of data). In this case, a compression operation may form part of determining a second set of data.

In order to bootstrap the methods described above, a communication manager on a client computing device may be downloadable as a small executable file over a network connection. The network connection may be secured, e.g. retrieved from a secure server using a Hypertext Transfer Protocol Secure (HTTPS) uniform resource locator (URL). A user of a client computing device may be able to authenticate themselves in this and/or the previously described case using credentials assigned by an entity that is supplying the virtual machine disk image, for example using log-in information associated with access to a secure network device within a controlled network of the entity. A download operation may run in parallel, e.g. in the background, while authentication and/or authorisation is performed. An executable file may be downloaded in response to a user entering user information into a secure web page, for example a page requesting a local virtual machine. Information entered by the user and/or data relating to an authenticated user account may be used to select appropriate configuration data.

The client computing device and/or server computing device described herein may themselves be a virtual machine, e.g. in the former case allowing a nesting of multiple virtual machines and in the latter case allowing virtualisation of a server from underlying server hardware.

The above examples are to be understood as illustrative. Further examples are envisaged. Certain variations are described in the passages above; however further variations are envisaged. It is to be understood that any feature described in relation to any one example may be used alone, or in combination with other features described, and may also be used in combination with one or more features of any other of the examples, or any combination of any other of the examples. Features of any one of the system components may be incorporated into any other of the system components. For example, operations as described in the methods herein may be implemented by: a communication manager alone; a virtual machine manager alone; a combination of both managers; and/or a combination of both managers and additional components such as a storage and/or network interface. Furthermore, equivalents and modifications not described above may also be employed without departing from the scope of the invention, which is defined in the accompanying claims.

What is claimed is:

1. A method for preparing and communicating data representative of a virtual machine disk image to a client computing device on a network, comprising:
communicating executable data to the client computing device over the network, the executable data configuring a skeleton virtual machine disk image for a virtual disk on the client computing device, wherein the skeleton virtual machine disk image comprises a sparse file populated with at least metadata comprising a file system index for the virtual disk, wherein the file system index indicates at least one of a location and file characteristics associated with data of the virtual disk;
determining a first set of data representative of at least a portion of a virtual machine disk image accessible by the client computing device over the network, the first set of data comprising data arranged in a first sequence; and
determining, from the first set of data, a second set of data for communication to the client computing device over the network, the second set of data comprising at least a portion of the first set of data arranged in a second sequence, the second sequence being different from the first sequence, wherein the client computing device implements a host operating system by way of one or more system files stored locally on the client computing device, and wherein a virtual machine manager operating within an environment provided by the host operating system implements a virtual operating system by way of the skeleton virtual machine disk image;

wherein determining the second set of data comprises:
obtaining, from a scan of said one or more system files that implement the host operating system that are stored locally on the client computing device, an indication of data stored locally on the client computing device, within the one or more system files, that is present in the first set of data; and excluding said data stored locally on the client computing device from the second set of data; and wherein the method further comprises:
responsive to the virtual machine manager performing a boot sequence for the virtual operating system, communicating the second set of data to the client computing device, the client computing device receiving the second set of data as a background process; and responsive to a request from the client computing device for data indicated by the sparse file as part of the boot sequence, the request being for data that does not form part of:
said data stored locally on the client computing device, or
data from the second set of data that has been communicated to the client computing device, communicating the data indicated by the sparse file as part of the boot sequence to the client computing device.

2. A method according to claim 1, wherein the second sequence corresponds to an order of use of the first set of data on the client computing device.

3. A method according to claim 1, wherein the second sequence is based on configuration data associated with at least one client computing device.

4. A method according to claim 1, wherein the second sequence is based on one or more of a profile associated with a user of the client computing device and an operating system of a virtual machine that is implemented using the virtual machine disk image.

5. A method according to claim 1, wherein a particular virtual machine disk image accessible on the network is communicable to a plurality of client computing devices and wherein a first client computing device has a different second sequence from a second client computing device.

6. A client computing device comprising:
a storage interface, implemented by computer program code stored on a memory and executed by a processor, for communicatively coupling the client computing device to at least one local non-volatile storage device, the at least one local non-volatile storage device storing one or more system files that are used to implement a host operating system;

a network interface for communicatively coupling the client computing device to a server computing device over one or more networks, the server computing device having access to at least a portion of a remote virtual machine disk image comprising a first set of data arranged in a first sequence;

a communication manager, implemented by computer program code stored on the memory and executed by the processor, arranged to receive data corresponding to the remote virtual machine disk image from the server computing device via the network interface and to store said received data as a local virtual machine disk image in said at least one storage device; and a virtual machine manager, implemented by computer program code stored on the memory and executed by the processor, arranged to implement a virtual machine on the computing device using the local virtual machine disk image stored in said at least one storage device, the virtual machine implementing a virtual operating system by way of the local virtual machine disk image, the virtual machine manager operating within an environment provided by the host operating system, wherein the communication manager is arranged to receive data comprising a second set of data from the server computing device, the second set of data being determined from the first set of data and comprising at least a portion of the first set of data arranged in a second sequence, the second sequence being different from the first sequence, wherein the client computing device comprises:
a data manager, implemented by computer program code stored on the memory and executed by the processor, arranged to scan said at least one local non-volatile storage device to determine whether data present in said one or more system files that implement the host operating system and that are stored locally on the client computing device corresponds to data present in the remote virtual machine disk image, wherein the second sequence excludes any data as determined by the data manager, wherein the communication manager is arranged to receive executable data to configure a skeleton virtual machine disk image for a virtual disk on the client computing device, wherein the skeleton virtual machine disk image comprises a sparse file populated with at least metadata comprising a file system index for the virtual disk, wherein the file system index indicates at least one of a location and file characteristics associated with data of the virtual disk;

wherein, responsive to the virtual machine manager performing a boot sequence for the virtual operating system, the communication manager is arranged to receive the second set of data as a background process; and wherein, responsive to a file input/output request for data indicated by the sparse file, said file input/output request comprising part of the boot sequence, the client computing device is arranged to determine whether said file input/output request is for one of said data stored locally on the client computing device as determined by the data manager and data from the second set of data that has been communicated to the client computing device, and responsive to a negative determination by the client computing device, the communication manager is arranged to send a request for the data indicated by the sparse file to the server computing device via the network interface and use the response to said request to fulfil the file input/output request.

7. A client computing device according to claim 6, wherein the second sequence corresponds to an order of use of the first set of data on the client computing device.

8. A client computing device according to claim 6, comprising:
a virtual machine disk manager arranged to receive a determination of data present in said at least one storage device that correspond to data present in the virtual machine disk image and to use said data for the local virtual machine disk image.

9. A server computing device comprising:
a network interface for communicatively coupling the server to one or more networks; and
a communication manager, implemented by computer program code stored on a memory and executed by a processor, arranged to instruct, via the network interface, communication of data corresponding to a virtual machine disk image to a client computing device, the client computing device implementing a host operating system by way of one or more locally-accessible system files, at least a portion of the virtual machine disk image comprising a first set of data arranged in a first sequence, the virtual machine disk image being for use in implementing a virtual operating system by way of a virtual machine manager on the client computing device, the virtual machine manager operating within an environment provided by the host operating system,
wherein the communication manager is arranged to receive an indication of data stored locally on the client computing device and accordingly instruct communication of data comprising a second set of data to the client computing device,
wherein the indication of data stored locally on the client computing device is obtained from a scan of said one or more locally-accessible system files that implement the host operating system on the client computing device,
wherein the second set of data is determined from the first set of data, said determination excluding at least a portion of the first set of data from the second set of data where said portion is indicated to be present within the one or more locally-accessible system files that implement the host operating system on the client computing device,
wherein the communication manager is arranged to:
communicate, to the client computing device, executable data to configure a skeleton virtual machine disk image for a virtual disk on the client computing device, wherein the skeleton virtual machine disk image comprises a sparse file populated with at least metadata comprising a file system index for the virtual disk, wherein the file system index indicates at least one of a location and file characteristics associated with data of the virtual disk;
communicate the second set of data to the client computing device as a background process for the client computing device responsive to the virtual machine manager of the client computing device performing a boot sequence for the virtual operating system;
receive a request from the client computing device for data indicated by the sparse file as part of the boot sequence, the request being for data that does not form part of:
said data stored locally on the client computing device, or
data from the second set of data that has been communicated to the client computing device; and
communicate the data indicated by the sparse file as part of the boot sequence to the client computing device.

10. A server computing device according to claim 9, wherein the communication manager is arranged to access configuration data, said configuration data determining said second sequence and indicating one or more of:
an order of use of the first set of data on the client computing device;
an operating system of a virtual machine that is implemented using the virtual machine disk image;
a profile associated with a user of the client computing device;
one or more files present in the first set of data that are not required to successfully implement a virtual machine; and
one or more files stored locally on the client computing device that are present in the first set of data.

11. A server computing device according to claim 10, wherein the communication manager is arranged to access configuration data for a plurality of client computing devices, a first set of client computing devices having different configuration data from a second set of client devices, the communication manager being arranged to instruct communication of data corresponding to the virtual machine disk image to the plurality of client computing devices.

12. A server computing device according to claim 9, comprising a storage interface for communicatively coupling the server to at least one storage device, the at least one storage device storing at least one virtual machine disk image.

13. A non-transitory computer-readable storage medium comprising a set of computer-readable instructions stored thereon, which, when executed by a processing system, cause the processing system to perform a method for preparing data representative of a virtual machine disk image for communication to a client computing device over a network, the method comprising:
communicating executable data to the client computing device over the network, the executable data configuring a skeleton virtual machine disk image for a virtual disk on the client computing device, wherein the skeleton virtual machine disk image comprises a sparse file populated with at least metadata comprising a file system index for the virtual disk, wherein the file system index indicates at least one of a location and file characteristics associated with data of the virtual disk;
determining a first set of data representative of at least a portion of a virtual machine disk image accessible by the client computing device over the network, the first set of data comprising data arranged in a first sequence; and
determining, from the first set of data, a second set of data for communication to the client computing device over the network, the second set of data comprising at least a portion of the first set of data arranged in a second sequence, the second sequence being different from the first sequence,
wherein the client computing device implements a host operating system by way of one or more system files stored locally on the client computing device, and a virtual machine manager operating within an environment provided by the host operating system implements a virtual operating system by way of the skeleton virtual machine disk image, wherein determining the second set of data comprises:
  obtaining, from a scan of said one or more system files that implement the host operating system that are stored locally on the client computing device, an indication of data stored locally on the client computing device, within the one or more system files, that is present in the first set of data; and
  excluding said data stored locally on the client computing device from the second set of data, and wherein the method further comprises:
  responsive to the virtual machine manager performing a boot sequence for the virtual operating system, communicating the second set of data to the client computing device, the client computing device receiving the second set of data as a background process; and
  responsive to a request from the client computing device for data indicated by the sparse file as part of the boot sequence, the request being for data that does not form part of:
    said data stored locally on the client computing device, or
    data from the second set of data that has been communicated to the client computing device,
    communicating the data indicated by the sparse file as part of the boot sequence to the client computing device.

* * * * *